US010288294B2

United States Patent
Griffiths et al.

(10) Patent No.: US 10,288,294 B2
(45) Date of Patent: May 14, 2019

(54) COMBUSTION STAGING SYSTEM

(71) Applicant: Rolls-Royce PLC, London (GB)

(72) Inventors: Michael Griffiths, Bromsgrove (GB); Daniel Bickley, Solihull (GB)

(73) Assignee: ROLLS-ROYCE PLC, London (GB)

( * ) Notice: Subject to any disclaimer, the term of this patent is extended or adjusted under 35 U.S.C. 154(b) by 505 days.

(21) Appl. No.: 15/064,245

(22) Filed: Mar. 8, 2016

(65) Prior Publication Data

US 2016/0273775 A1  Sep. 22, 2016

(30) Foreign Application Priority Data

Mar. 20, 2015  (GB) .................................. 1504720.2
Mar. 26, 2015  (GB) .................................. 1505195.6

(51) Int. Cl.
| | |
|---|---|
| *F02C 9/00* | (2006.01) |
| *F23R 3/34* | (2006.01) |
| *F02C 7/228* | (2006.01) |
| *F02C 7/232* | (2006.01) |
| *F23K 5/06* | (2006.01) |

(Continued)

(52) U.S. Cl.
CPC .............. *F23R 3/346* (2013.01); *F02C 7/222* (2013.01); *F02C 7/228* (2013.01); *F02C 7/232* (2013.01); *F02C 9/263* (2013.01); *F02C 9/34* (2013.01); *F23K 5/06* (2013.01); *F23K 5/147* (2013.01);

(Continued)

(58) Field of Classification Search
CPC .......... F02C 7/222; F02C 7/228; F02C 7/232; F02C 9/263; F02C 9/34; F23K 5/06; F23K 5/147; F23N 2035/24; F23R 3/283; F23R 3/343; F23R 3/346

See application file for complete search history.

(56) References Cited

U.S. PATENT DOCUMENTS

| | | | | |
|---|---|---|---|---|
| 4,337,616 A | * | 7/1982 | Downing | ............... F02C 9/34 60/39.281 |
| 5,402,634 A | * | 4/1995 | Marshall | ................ F02C 7/232 60/734 |

(Continued)

FOREIGN PATENT DOCUMENTS

| | | |
|---|---|---|
| EP | 2 063 087 A2 | 5/2009 |
| EP | 2339147 A2 | 6/2011 |

(Continued)

*Primary Examiner* — Jesse S Bogue
(74) *Attorney, Agent, or Firm* — Oliff PLC

(57) ABSTRACT

A combustion staging system has a splitting unit receiving and splitting metered fuel flow into out-going pilot and mains flows; pilot and mains fuel manifolds receiving the pilot and mains flows; and parallel mains flow scheduling valves distributing the mains flow. The mains flow scheduling valves pass the pilot fuel flow to injector pilot discharge orifices. Each mains flow scheduling valve has a chamber containing a piston, the chamber to a piston pilot side communicating with the pilot fuel manifold and the chamber to a mains side of the piston communicating with the mains fuel manifold. The piston is biased towards a closed pilot-only position preventing flow out of the chamber mains side to the injector mains discharge orifice. The piston is movable under increased pressure in the mains fuel manifold to an open pilot-and-mains position allowing flow out of the chamber mains side to the injector mains discharge orifice.

15 Claims, 12 Drawing Sheets

(51) Int. Cl.
*F23K 5/14* (2006.01)
*F02C 9/34* (2006.01)
*F23R 3/28* (2006.01)
*F02C 7/22* (2006.01)
*F02C 9/26* (2006.01)

(52) U.S. Cl.
CPC .............. *F23R 3/283* (2013.01); *F23R 3/343* (2013.01); *F23N 2035/24* (2013.01)

(56) References Cited

U.S. PATENT DOCUMENTS

| | | | |
|---|---|---|---|
| 5,448,882 A * | 9/1995 | Dyer | F02C 7/228 60/39.281 |
| 5,809,771 A * | 9/1998 | Wernberg | F02C 7/228 123/447 |
| 5,881,550 A | 3/1999 | Toelle | |
| 6,813,876 B2 | 11/2004 | Griffiths et al. | |
| 7,322,373 B2 | 1/2008 | Lewis | |
| 8,572,977 B2 * | 11/2013 | Oda | F02C 7/228 60/739 |
| 8,887,752 B2 * | 11/2014 | Rawlinson | F02C 7/228 137/98 |
| 2009/0320480 A1 | 12/2009 | Scully | |
| 2009/0320482 A1 * | 12/2009 | Scully | F02C 9/26 60/746 |
| 2012/0159953 A1 * | 6/2012 | Griffiths | F02C 7/228 60/734 |
| 2012/0227842 A1 * | 9/2012 | Griffiths | F02C 7/228 137/561 A |
| 2013/0061599 A1 * | 3/2013 | Van Alen | F02C 7/12 60/779 |

FOREIGN PATENT DOCUMENTS

| | | |
|---|---|---|
| EP | 2469057 A1 | 6/2012 |
| EP | 2554823 A1 | 2/2013 |
| GB | 2312250 A | 10/1997 |
| GB | 2523126 A | 8/2015 |

* cited by examiner

COMBUSTION STAGING SYSTEM

FIELD OF THE INVENTION

The present invention relates to a combustion staging system for fuel injectors of a multi-stage combustor of a gas turbine engine.

BACKGROUND

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging.

A typical annular combustor has a circumferential arrangement of fuel injectors, each associated with respective pilot and mains feeds extending from the circumferentially extending pilot and mains manifolds. Each injector has a nozzle housing the discharge orifices which discharge fuel into the combustion chamber of the combustor, a feed arm for the transport of fuel to the nozzle, and a head at the outside of the combustor at which the pilot and mains feeds enter the feed arm. Within the injectors, a check/distribution valve, known as a fuel flow scheduling valve (FSV), is typically associated with each feed so that when a pilot or mains stage is de-selected, the valve (i) provides a drip tight seal preventing fuel from leaking into the injector causing coking and (ii) prevents combustion chamber gases entering the fuel system.

Multi-stage combustors may have further stages and/or manifolds. For example, the pilot manifold may be split into two manifolds for lean blow-out prevention.

During pilot-only operation, the splitter valve generally directs fuel for burning flows only through the pilot fuel circuit (i.e. pilot manifold and feeds). It is therefore conventional to control temperatures in the stagnant (i.e. mains) fuel circuit to prevent coking due to heat pick up from the hot engine casing. One known approach, for example described in EP A 2469057 (hereby incorporated by reference), is to provide a separate recirculation manifold which is used to keep the fuel in the mains manifold cool when it is deselected. It does this by keeping the fuel in the mains manifold moving, allowing flow from a high pressure source (typically a gear pump delivery pressure, HP) to pass through a cooling flow solenoid valve, through the recirculation and mains manifolds before returning to a low pressure sink (typically a gear pump inlet pressure LP) via a valve and restrictor network. The recirculation and mains manifolds experience a low intermediate pressure, above LP but insufficient to crack open the mains FSVs. When mains is selected, a cooling flow also has to be maintained in the recirculation manifold to avoid coking.

A problem associated with this approach is that blockage may occur in the recirculation path. The consequence of such a failure is dependent on the location of the blockage. For example, if the blockage occurs in the recirculation path on the return-to-LP side of the manifolds, the result can be an increased pressure in the recirculation path which opens one or more of the mains FSVs, potentially causing hot streaks due to the resultant mal-distribution of fuel flow and, as a consequence, turbine damage.

If the blockage occurs on the recirculation path on the HP feed side of the manifolds, the result can be a loss of cooling flow and/or pressure in the recirculation path at the injectors, potentially resulting in combustion gases leaking back from combustion chamber pressure, past the mains FSVs and thence to the low pressure side fuel system of the system via the exit from the recirculation path. This can lead to damage and/or failure within the fuel system. Air flow past the fuel drip tight seal of an FSV may be possible due to the low viscosity of air relative to that of fuel.

A further possible failure mode with this system is associated with the relatively high cracking pressure of the FSVs, set to avoid incorrect opening of the mains FSVs in pilot-only operation at conditions where the recirculation path sink pressure, LP, can be high relative to the combustion chamber. If one of the mains FSVs fails open, significant mal-distribution of fuel injection around the combustor can persist since flow through the failed open mains FSV has to increase to a significant level before other mains FSVs fully open. This can result in turbine torching and consequent damage.

SUMMARY

It would be desirable to provide a combustion staging system which is less likely to suffer from such problems.

Accordingly, in a first aspect, the present invention provides a combustion staging system for fuel injectors of a multi-stage combustor of a gas turbine engine, the system having:
  a splitting unit which receives a metered fuel flow and controllably splits the metered fuel flow into out-going pilot and mains fuel flows to perform pilot-only and pilot-and-mains staging control of the combustor,
  pilot and mains fuel manifolds which respectively receive the pilot and mains fuel flows; and
  a plurality of parallel mains flow scheduling valves which distribute the mains fuel flow from the mains manifold to mains discharge orifices of respective injectors of the combustor and which also pass the pilot fuel flow from the pilot manifold to pilot discharge orifices of the injectors;
  wherein each mains flow scheduling valve has a chamber containing a movable piston, the chamber to a pilot side of the piston being in fluid communication with the pilot fuel manifold and the chamber to a mains side of the piston being in fluid communication with the mains fuel manifold, the piston being biased towards a closed pilot-only position which prevents flow out of the mains side of the chamber to the mains discharge orifice of the respective injector, and the piston being movable under an increase in pressure in the mains fuel manifold to an open pilot-and-mains position which allows flow out of the mains side of the chamber to the mains discharge orifice of the respective injector.

Advantageously the staging system can avoid a need for complex recirculation architectures as the pilot fuel flow can pass through the main flow scheduling valves under both pilot-only and pilot-and-mains operation, thereby cooling the valves. The pilot flow in each valve can be along a relatively unrestricted path to avoid or reduce additional pressure losses in the pilot flow.

Advantageously, the system can be operated without pilot flow scheduling valves. These were incorporated into the system of EP A 2469057 primarily to prevent pilot fuel leaking into the injectors at shut down with the attendant risk of injector coking and leakage into the combustion chamber. The system of the present invention, however, is compatible with a conventional reverse-purge manifold drain capability, whereby at shut down a manifold drain valve is opened to allow combustion chamber pressure to drive the fuel out of the pilot manifold through the drain valve to a drains tank. By avoiding a need for pilot flow scheduling valves operating in parallel to the mains flow scheduling valves, the risk of pilot flow mal-distribution associated with a failed open pilot flow scheduling valve can be reduced.

The system can also greatly reduce the risk of mains flow ma-distribution in the event of a mains flow scheduling valve failing open. By referencing the pilot side of the chamber to pilot manifold pressure, the cracking pressure of the mains flow scheduling valves can be reduced. Thus when mains is de-selected via the splitter unit, the pressures acting on either side of each piston are substantially equal so that only a low load spring is required to maintain each valve in the closed pilot-only position. Accordingly, the mains flow scheduling valves can be low cracking pressure devices. Then, if one of the valves fails open, the flow through the corresponding injector does not have to reach a very high level before the mains manifold pressure increases sufficiently to cause the other mains flow scheduling valves to open, thereby reducing the risk of significant mains flow mal-distribution and subsequent turbine torching/damage which could occur if the flow through the single failed open injector were to reach a high level.

In a second aspect, the present invention provides a gas turbine engine having the combustion staging system according to the first aspect.

Optional features of the invention will now be set out. Unless otherwise specified, these are applicable singly or in any combination with any aspect of the invention.

The splitting unit can be a flow splitting valve, e.g. having a spool whose position is controllable to control the split of the metered fuel flow between the pilot and mains fuel flows.

The piston of each mains flow scheduling valve may be spring-biased towards the pilot-only position.

According to a first cooling flow option, each mains flow scheduling valve may further have a cooling flow bypass line providing fluid communication between the mains and pilot sides of its chamber. The splitting unit may then be configured to allow a cooling flow through the mains fuel manifold when the mains flow scheduling valves are in their pilot-only positions, wherein the cooling flow passes through the bypass lines to cool the mains fuel manifold during pilot-only operation. The cooling flow can then pass to the pilot discharge orifices for burning in the combustor. With such an arrangement, the piston may shut off the bypass line when the piston is in its pilot-and-mains position.

According to a second cooling flow option, the splitting unit may send a cooling flow to the mains fuel manifold during pilot-only operation; and the system may further have a mains cooling valve which, during pilot-only operation, opens a bypass connection between the mains and pilot fuel manifolds such that the cooling flow passes from the mains fuel manifold to the pilot fuel manifold. The cooling flow through the mains fuel manifold in the pilot-only mode then helps to avoid coking in the mains manifold when the mains flow scheduling valves are in their pilot-only positions. Advantageously, the cooling flow can pass to the pilot discharge orifices for burning in the combustor, such that the correct staging split is maintained.

In the second cooling flow option, the mains cooling valve may be located at the base of the engine. This can help to reduce engine heat soak-back into the valve.

In the second cooling flow option, each mains flow scheduling valve may provide a leak-tight seal between the pilot and mains sides of the chamber when its piston is in its pilot-only position, and a reduced seal between the pilot and mains sides of the chamber when the piston is in its pilot-and-mains position. For example, the piston may be dual face-sealed in the chamber. Some fuel may thus leak from pilot pressure to mains via clearance between the piston and its sleeve during pilot-and-mains operation. However, improved reliability of piston movement within the chamber may compensate for this disadvantage.

In the second cooling flow option, the mains manifold may be configured such that flow through the mains manifold passes in series across respective entrances to the mains flow scheduling valves, the bypass connection between the mains and pilot fuel manifolds comprising parallel first and second fuel lines, the first fuel line extending from the mains to the pilot fuel manifold from an upstream side of the last entrance, the second fuel line extending from the mains to the pilot fuel manifold from a downstream side of the last entrance, and the first and second lines being in fluid communication in the mains cooling valve such that during pilot-and-mains operation fuel circulates around the first and second fuel lines. In this way, fuel cooling of the first and second fuel lines can be maintained during pilot-and-mains operation, even if the mains cooling valve closes the bypass connection during pilot-and-mains operation.

Alternatively, in the second cooling flow option, the mains manifold may be configured such that flow through the mains manifold splits into a first fraction which passes in series across respective entrances to a first portion of the mains flow scheduling valves, and a second fraction which passes in second series across respective entrances to a remaining second portion of the mains flow scheduling valves, the bypass connection between the mains and pilot fuel manifolds comprising a fuel line extending from the mains manifold from a location on the mains manifold which is downstream of the last entrances of the first and second portions of the mains flow scheduling valves. This arrangement also allows fuel cooling of the fuel line of the bypass connection during pilot-and-mains operation, particularly if the mains cooling valve allows a leakage flow to pass from the mains fuel manifold to the pilot fuel manifold.

In the second cooling flow option, the pilot manifold may include a section which is within the mains cooling valve such that at least a portion of the pilot fuel flow passes through the mains cooling valve. This can help to cool the mains cooling valve.

Additionally or alternatively to the above cooling flow options, the mains manifold may be adapted to receive a cooling air flow thereover (the cooling air flow being taken, for example, from the bypass air flow of a ducted fan gas turbine engine). This can help to avoid coking in the mains manifold, particularly if the fuel in the mains manifold remains stationary (i.e. with no cooling flow of fuel therethrough) when the mains flow scheduling valves are in their pilot-only positions.

The system may further have control means for setting a constant pressure differential between the metered fuel flow received by the splitting unit and the pilot fuel flow out of the splitting unit.

For example, when the splitting unit includes a flow splitting valve having a spool whose position is controllable to control the split of the metered fuel flow between the pilot and mains fuel flows, such control means may comprise:
- a pressure sensor to measure the pressure differential between the metered fuel flow received by the splitter valve and the pilot fuel flow out of the splitter valve, and/or a further pressure sensor to measure the pressure differential between the metered fuel flow received by the splitter valve and the mains fuel flow out of the splitter valve; and
- a device to measure the position of the spool. If the pressure drop across the splitter valve to the pilot fuel outflow is then controlled and the spool position measured, it is possible to set the pilot flow as a function of spool position. Similarly, if the pressure drop across the splitter valve to the mains fuel outflow is controlled and the spool position is measured, it is possible to set the mains flow as a function of spool position.

As another example, the control means may comprise a pressure drop throttle valve located between the splitting unit and the pilot manifold to controllably throttle the pilot fuel flow and/or between the splitting unit and the mains manifold to controllably throttle the mains fuel flow. Such an arrangement can be used to set a constant pressure drop across the splitting unit to the pilot and/or mains fuel outflow. Pilot and/or mains flow can then be made a function of splitting unit (e.g. splitter valve spool) position.

As yet another example, the control means may comprise a flow sensing valve located between the splitting unit and the pilot manifold to measure the flow rate of the pilot fuel flow through the flow sensing valve, or a flow sensing valve located between the splitting unit and the mains manifold to measure the flow rate of the mains fuel flow through the flow sensing valve.

The combustion staging system may further have a plurality of pilot flow scheduling valves, each receiving the pilot fuel flow passed by a respective one of the mains flow scheduling valves, the pilot flow scheduling valves distributing the received pilot fuel flow to their respective pilot discharge orifices when the pilot fuel flow exceeds a cracking pressure set by the pilot flow scheduling valves.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
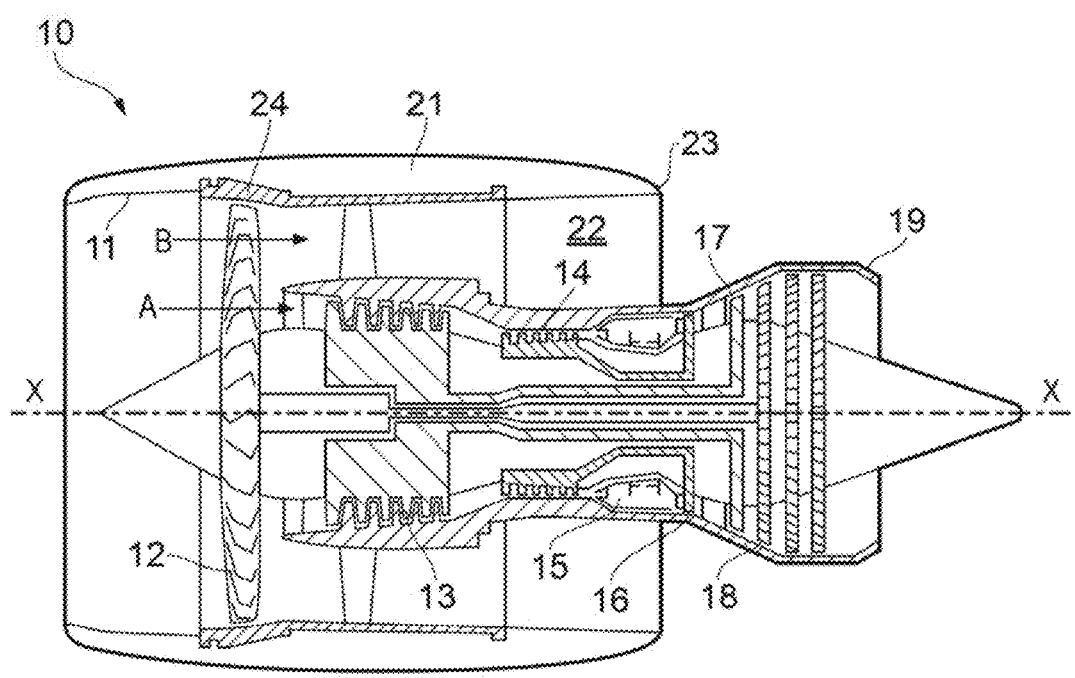
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23. A fan case 24 surrounds the fan 12 at the inner side of the nacelle.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine has a pumping unit comprising a low pressure (LP) pumping stage which draws fuel from a fuel tank of the aircraft and supplies the fuel at boosted pressure to the inlet of a high pressure (HP) pumping stage. The LP stage typically comprises a centrifugal impeller pump while the HP pumping stage may comprise one or more positive displacement pumps. e.g. in the form of twin pinion gear pumps. The LP and HP stages are typically connected to a common drive input, which is driven by the engine HP or IP shaft via an engine accessory gearbox.

A fuel supply system then accepts fuel from the HP pumping stage for feeds to the combustor 15 of the engine 10. This system typically has a hydro-mechanical unit (HMU) comprising a fuel metering valve operable to control the rate at which fuel is allowed to flow to the combustor. The HMU further typically comprises: a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof for correct operation of any fuel pressure operated auxiliary devices (such variable inlet guide vane or variable stator vane actuators) that receive fuel under pressure from the HMU. Further details of such an HMU are described in EP A 2339147 (which is hereby incorporated by reference).

An engine electronic controller (EEC) commands the HMU fuel metering valve to supply fuel to fuel injectors 34 of the combustor 15 at a given flow rate. The metered fuel flow leaves the HMU and arrives at a staging system at a pressure $P_{fmu}$.

Staging System—Embodiment 1

Figure 2:
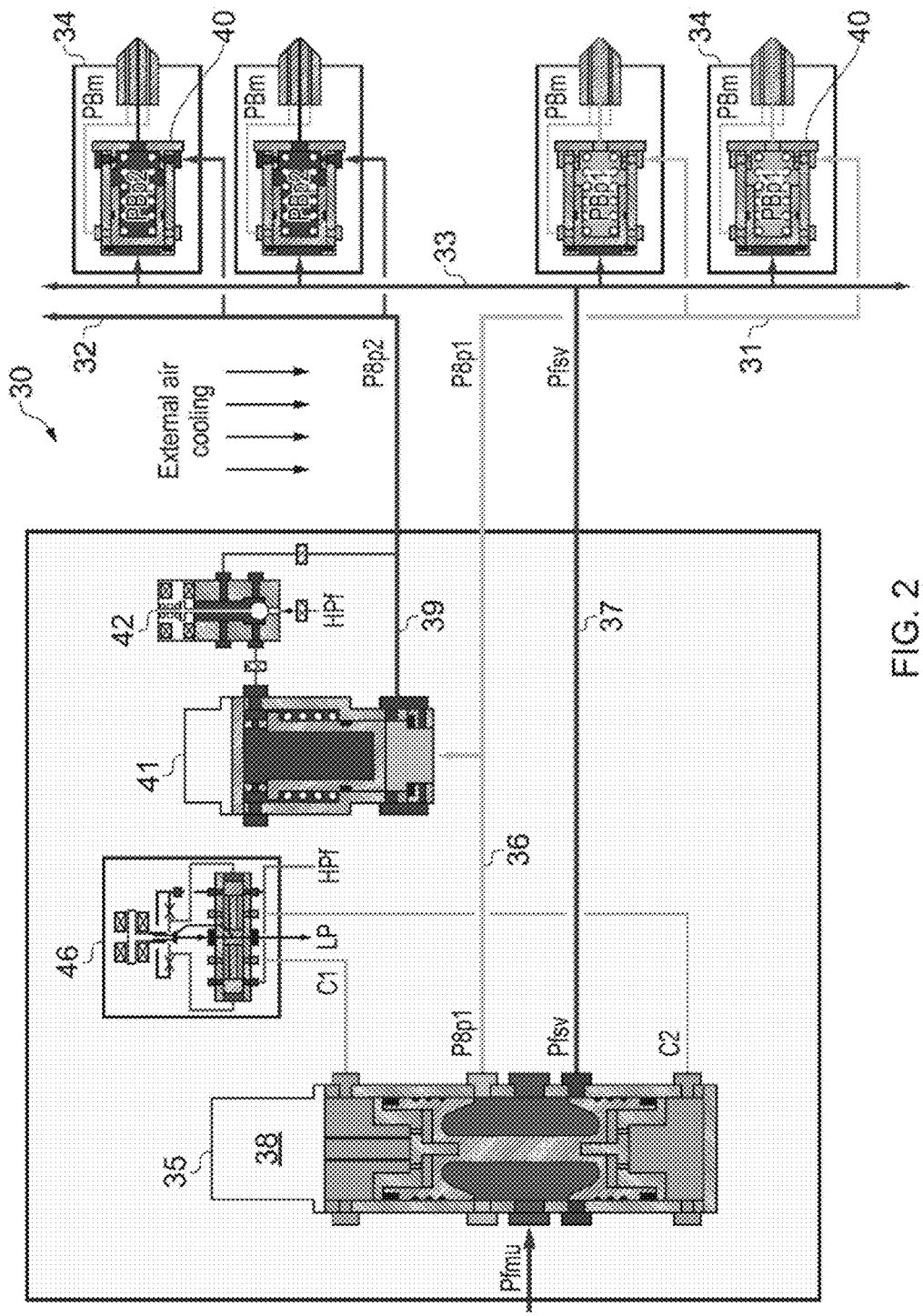
FIG. 2 shows schematically a staging system for fuel injectors of the combustor of the engine of FIG. 1 in pilot-only operating mode.
Figure 3:
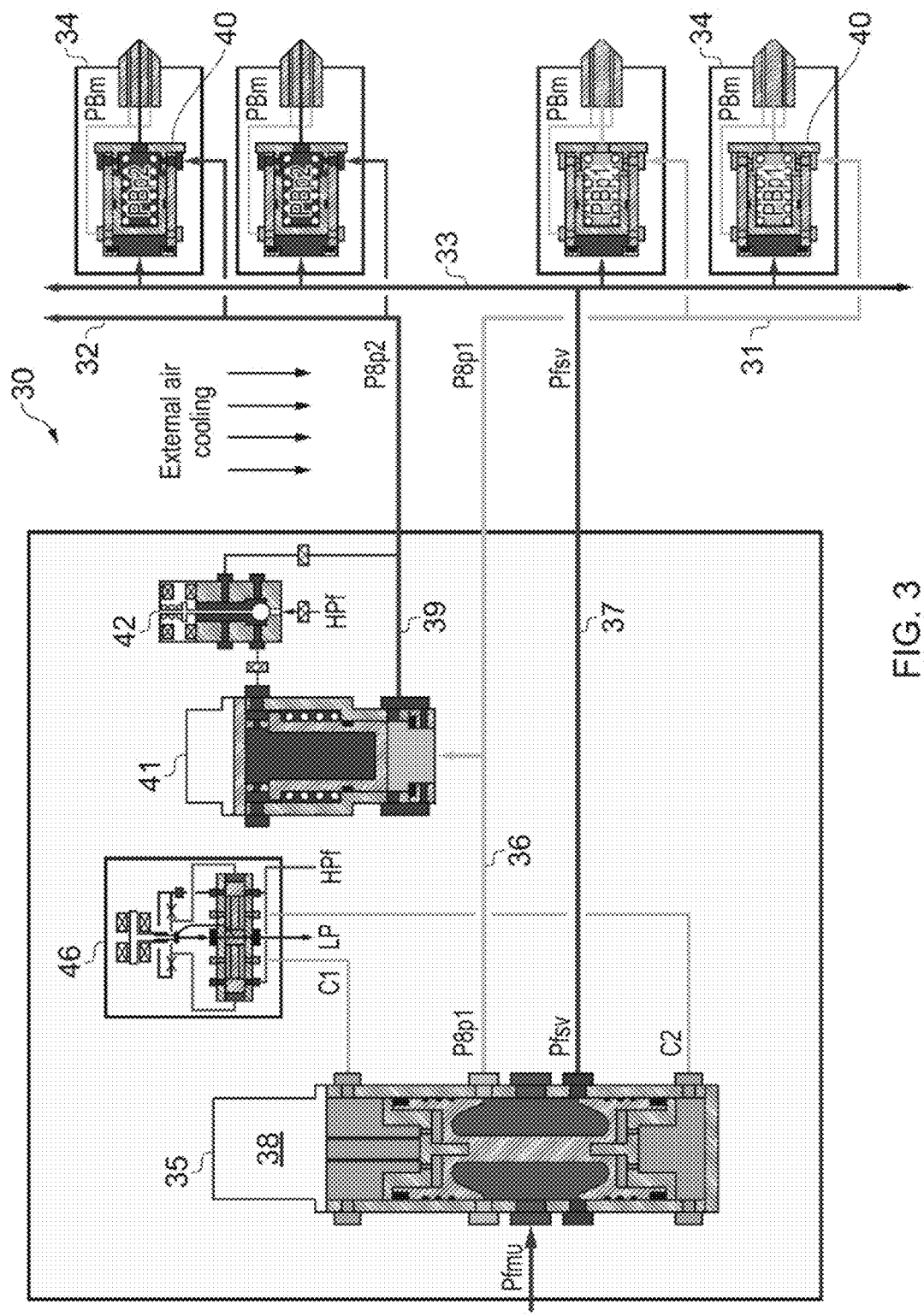
FIG. 3 shows schematically the staging system of FIG. 2 in pilot-and-mains operating mode.

A first embodiment of the staging system 30 is shown schematically in FIGS. 2 and 3. The staging system splits the fuel under the control of the EEC (not shown) into two flows: one at a pressure $PB_{p1}$ for first 31 and second 32 pilot manifolds and the other at a pressure $P_{fsv}$ for a mains manifold 33. The first pilot manifold feeds pilot discharge orifices of a subset of the fuel injectors. The second pilot manifold feeds pilot discharge orifices of the rest of the fuel injectors. The mains manifold feeds mains discharge orifices of all the fuel injectors. Mains fuel flow scheduling valves (FSVs) 40 at the injectors prevent combustion chamber gases entering the respective manifolds and also provide a drip tight seal between the mains manifold and the injectors when mains is de-staged. By varying the fuel split between the manifolds, the EEC can thus perform staging control of the engine.

In more detail, the staging system 30 has a fuel flow splitting valve (FFSV) 35, which receives the metered fuel flow from the HMU at pressure $P_{fmu}$. A spool is slidable within the FFSV under the control of a servo valve 46, the position of the spool determining the outgoing flow split between a pilot connection pipe 36 which delivers fuel to the first 31 and second 32 pilot manifolds and a mains connection pipe 37 which delivers fuel to the mains manifold 33. The spool can be positioned so that the mains stage is deselected, with the entire metered flow going to the pilot stage. An LVDT 38 provides feedback on the position of the spool to the EEC, which in turn controls staging by control of the servo valve.

The pilot discharge orifices are divided into two groups by the first 31 and second 32 pilot manifolds in order to provide lean blow out protection. More particularly, the second pilot manifold connects to the pilot connection pipe 36 via a further connection pipe 39 (at a $PB_{p2}$) and a lean blow out protection valve 41. This is operable to terminate or substantially reduce the supply of fuel to the second pilot manifold and associated pilot discharge orifices, when desired, so as to increase the flow of fuel to the first pilot manifold and associated discharge orifices under low fuel conditions for a given metered flow from the HMU. In the arrangement illustrated, the valve 41 is controlled by way of a solenoid operated control valve 42, although other forms of control are possible, such as by a servo-type valve (for example an electro hydraulic servo valve). In this way, under low fuel conditions the flow of fuel to the pilot discharge orifices may be directed preferentially to the discharge orifices served by the first pilot manifold, whereby the risk of a lean blow out condition arising can be reduced. Further details of such lean blow out protection are described in EP A 2469057.

The part of the staging system 30 comprising the FFSV 35, servo valve 46, lean blow out protection valve 41 and control valve 42 is mounted to the fan case 24. The connection pipes 36, 37, 39 then extend across the bypass duct 22 to the manifolds 31, 32, 33, which wrap around the core engine in proximity to the injectors 34.

In the staging system described in EP A 2469057, each injector has a pilot FSV and a mains FSV for respectively the flows from pilot and mains manifolds. In contrast, in the staging system shown in FIGS. 2 and 3, pilot FSVs are not provided, and instead pilot flow is routed through modified mains FSVs 40 with negligible restriction: the mains FSVs 40 distribute the mains flow from the mains manifold 33 to the mains discharge orifices in the injectors 34, while the pilot flow is passed through the mains FSVs for valve cooling purposes. These FSVs each have a chamber containing a movable, spring-biased piston, with the chamber to a pilot (spring) side of the piston being in fluid communication with the respective pilot fuel manifold 31, 32 and the chamber to a mains (non-spring) side of the piston being in fluid communication with the mains fuel manifold 33. In this way, the FSVs 40 have a reduced cracking pressure with the pilot (spring) side of the FSVs being referenced to pilot manifold pressure ($PB_{p1}$ or $PB_{p2}$) rather than the lower pressure downstream of the FSVs (as is the case with the system of EP A 2469057). With the low cracking pressure, the pressures on either side of each piston ($P_{fsv}$ and $PB_p$) are approximately equal during the pilot-only operating mode (FIG. 2) such that the FSV springs maintain the FSVs 40 in a closed position (i.e. no flow from the mains manifold 33 through the FSVs to the mains discharge orifices of the injectors 34).

In this pilot-only operating mode, the position of the FFSV 35, controlled by the servo valve 46, is such that there is a large flow number opening between the HMU supply and the pilot connection pipe 36, such that $P_{fmu}=PB_{p1}=f_{fsv}$). Any difference between the metered fuel pressure ($P_{fmu}$) from the HMU supply and the pilot manifold pressures ($PB_{p1}$ and $PB_{p2}$) is generally less than 10 psid (69 kPa). This is insufficient to open the FSVs 40, which may have a cracking pressure of typically 30 paid (207 kPa). In the pilot-only mode there can be a small opening in the FFSV between the HMU supply and the mains connection pipe 37 to allow for thermal expansion of fuel in the mains manifold 33 (i.e. to prevent a trapped volume in the mains manifold). The mains manifold remains fully primed in pilot-only mode, such that there is no hazardous failure to meet acceleration requirements when mains staging is selected. When mains staging is selected the FFSV 35 (controlled by the servo-valve 46) moves to increase the opening between the HMU supply and the mains connection pipe 37. This reduces $PB_{p1}$ and $PB_{p2}$ relative to $P_{fsv}$, resulting in fuel flow to the mains discharge orifices of the injectors 34 (FIG. 3).

If one of the FSVs 40 fails such that it opens in pilot-and-mains mode, fuel flows from the HMU supply through the FFSV 35 to the mains manifold 33 and thence through the open port in the failed FSV to the mains discharge orifice of the respective injector 34. However, as the FSVs have a relatively low cracking pressure, only a marginal increase in pressure in the mains manifold, resulting from flow through the port in the failed FSV, causes the other FSVs to open. This then leads to a relatively even distribution of fuel flow injection around the combustor. Thus, by ensuring that the other FSVs open before a severe level of fuel flow through the failed FSV is reached (i.e. a level that results in hot streaks and turbine damage), the staging system 30 can mitigate the potentially hazardous mal-distribution issues associated with failed open mains FSVs in the system of EP A 2469057 which incorporates high cracking pressure FSVs. Further, with a relatively low pressure differential acting across the FSV pistons, the FSVs 40 are less susceptible to incorrect opening due to pump ripple in pilot-only mode if the pressure ripples either side of the FSV piston are in phase.

The staging system 30 also allows complex cooling recirculation architectures to be avoided, which avoids the hazards that can result from combustion gases leaking past mains FSVs and thence to the low pressure side of the fuel system.

Cooling of the FSVs 40 can be provided by the pilot flow that is continuously routed through the FSVs. If necessary, however, further cooling arrangements can be provided for the pilot manifolds 31, 32 and particularly the mains 33 manifold, e.g. by using a small portion of the air flow B through the bypass duct 22.

The pilot/mains flow split is achieved via movement of the spool within the FFSV 35. However, an accurate spilt (which may be otherwise by affected by FSV tolerances, variation and friction) can be promoted by either measuring the FFSV pressure differentials or by setting a constant pressure differential $P_{fmu}-PB_{p1}$ across the FFSV 35 inflow and outflow metering ports. This can be achieved in a number of ways. For example, the system 30 can have pressure sensors to measure $P_{fmu}-PB_{p1}$ and/or $P_{fmu}-P_{fsv}$. Combined with the spool position feedback provided by the LVDT 38, knowledge of the pressure drop(s) across the pilot/mains metering ports in the FFSV can allow the EEC to compute the pilot and mains flows, driving the FFSV via the servo valve 46 to set the required pilot/mains flow split. As another example, a pressure drop throttle valve located on the pilot connection pipe 36 can sense the pressure drop $P_{fmu}-PB_{p1}$ and throttle the pilot flow to maintain a constant $P_{fmu}-PB_{p1}$ pressure differential. With this pressure differential nominally constant, the pilot flow can be set as a function of spool position with position measurement provided by the LVDT 38.

As yet another example, a flow sensing valve can be located on the pilot connection pipe 36 or the mains connection pipe 37. Such an example is illustrated in the variant staging system 30 shown in FIGS. 4 and 5, the system having a mains fuel flow sensing valve (MFFSV) 43 on the mains connection pipe 37. The position of the FFSV 35 is controlled via the servo valve 46 using the position feedback signal from the LVDT 44 attached to the MFFSV 43 to give accurate flow control in the connection pipes 36 and 37. In particular, the position feedback signal that is input to the staging control logic in the EEC is taken from an LVDT 44 measuring a spool position of the MFFSV rather than the FFSV. In such an arrangement, MFFSV spool position is a measure of the mains flow.

Figure 4:
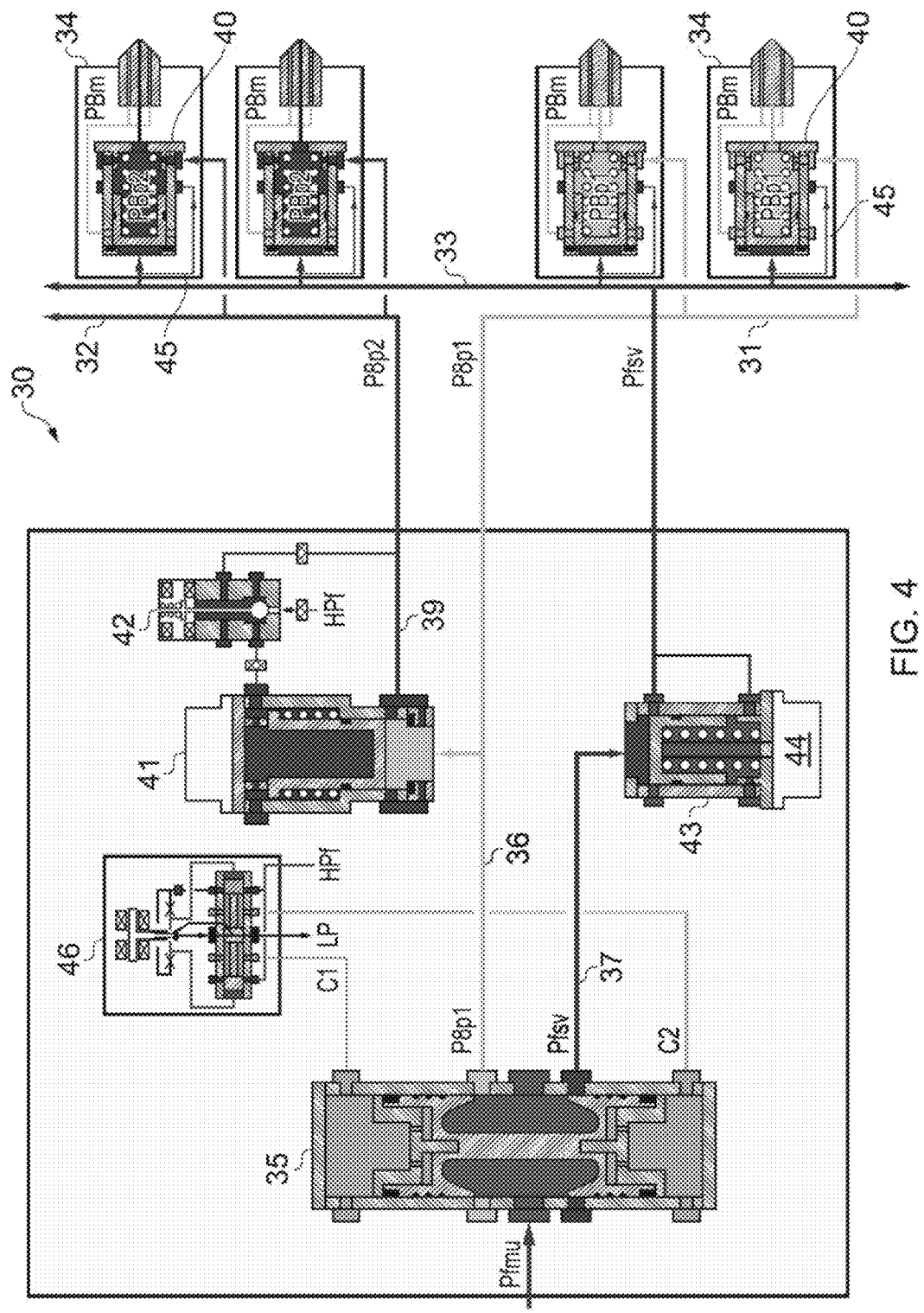
FIG. 4 shows schematically a variant of the staging system of FIG. 2 in pilot-only operating mode.
Figure 5:
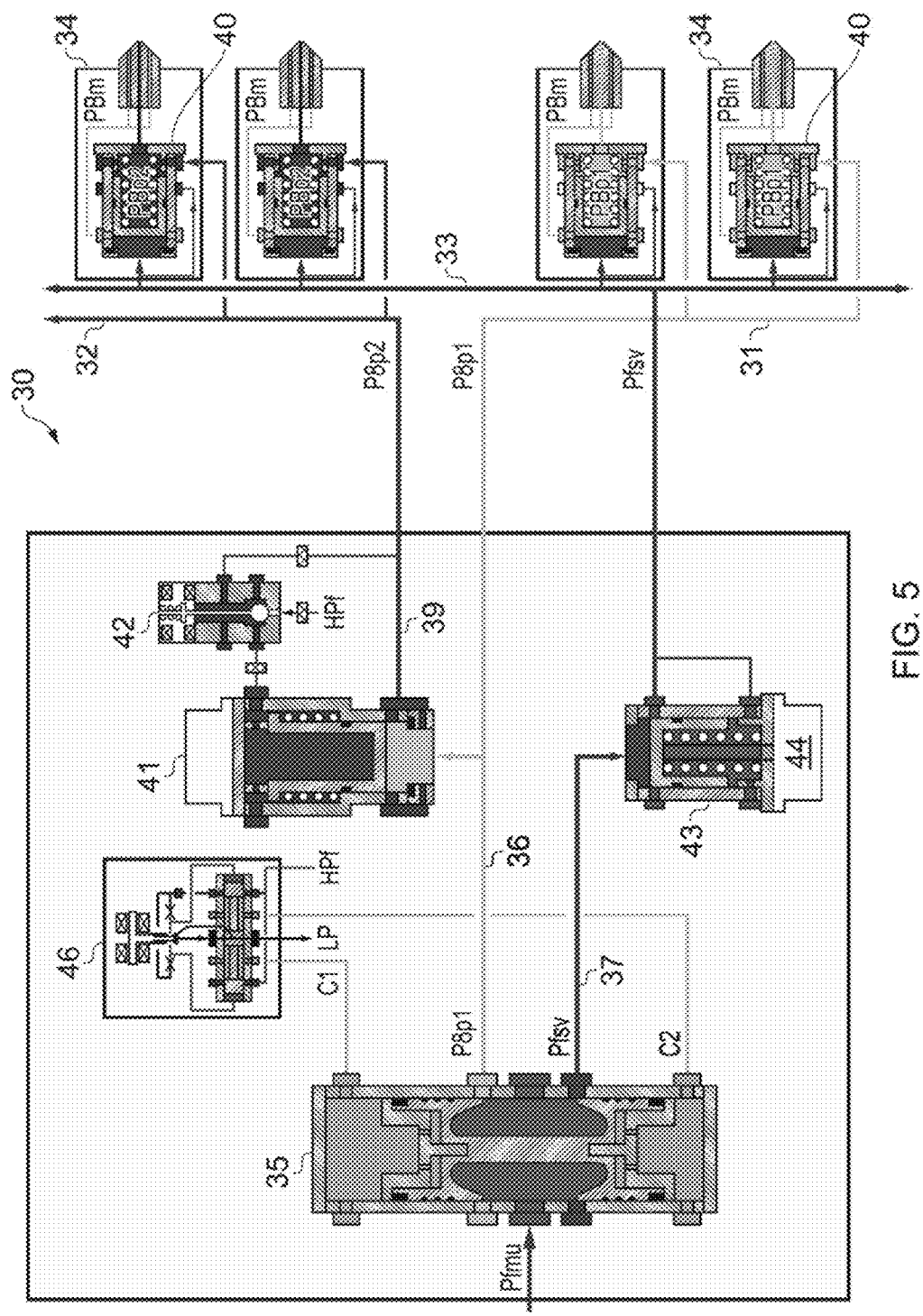
FIG. 5 shows schematically the variant staging system of FIG. 4 in pilot-and-mains operating mode.

In the variant staging system 30 of FIGS. 4 and 5, cooling flow orifices are incorporated into the FSVs 40. In each FSV, these orifices form flow-restrictions in a bypass line 45 providing fluid communication between the mains and pilot sides of the chamber. In the pilot-only operating mode (see FIG. 4) these orifices are open resulting in a continuous flow of fuel through the mains manifold 33 to the pilot discharge orifices of the injectors 34, which maintains cooling in the mains manifold and the lines from the mains manifold to the FSVs. This cooling flow is sensed by the MFFSV 43 and the feedback signal from the MFFSV LVDT 44 to the EEC is used to adjust the spool position of the FFSV 35 (via the servo valve 46) if the cooling flow needs to be altered. In the pilot-only operating mode the pressure drop across the FSV piston ($P_{fsv}-PB_p$) is typically low, e.g. <5 psid (34 kPa). A typical cooling flow of 10 imperial gallons per hour (45 litres per hour) through a total cooling orifice of 9 igph/sqrt(psi) (4.33 cc/s/sqrt(kPa)) flow number gives ($P_{fsv}-PB_p$)=1.24 psid (8.55 kPa). This is insufficient to open the FSVs which typically require 30 psid (207 kPa) for cracking and 27 psid (186 kPa) to lift the piston off its stop.

When the pilot-and-mains operating mode is selected (see FIG. 5), the spool position of the FFSV 35 is altered to increase the opening of the mains port of the FFSV and reduce the opening of the pilot port of the FFSV, which increases the pressure differential $P_{fmu}-PB_{p1}$ across the pilot port, thus producing a rise in the pressure $P_{fsv}$ relative to $PB_{p1}$ and $PB_{p2}$. This results in the pistons of the FSVs 40 opening against their respective spring forces, and fuel flowing through the FSV to the mains discharge orifices of the injectors 34. In addition, the opening of the FSV pistons closes off the cooling flow orifices in the FSVs to shut off the bypass lines 45. The MFFSV now senses the flow to the mains discharge orifices of the injectors and the feedback signal from the LVDT 44 is used to adjust the FFSV spool position via the EEC and FFSV servo valve 46 to set the correct pilot/mains flow split.

Thus inclusion of the MFFSV 43 on the mains connection pipe 37 enables accurate control of the pilot/mains split irrespective of FSV tolerances, variation and friction. The MFFSV position from the LVDT 44 is a measure of mains manifold cooling flow during pilot-only operation, and total mains burnt flow during pilot-and-mains operation. This flow measurement signal is sent to and used by the EEC control logic to provide an MFFSV position demand signal that is used to drive the FFSV servo valve 46 to move the FFSV 35 to set the correct pilot/mains flow split (during pilot-and-mains operation) or the correct mains cooling flow (during pilot-only operation).

Figure 6:
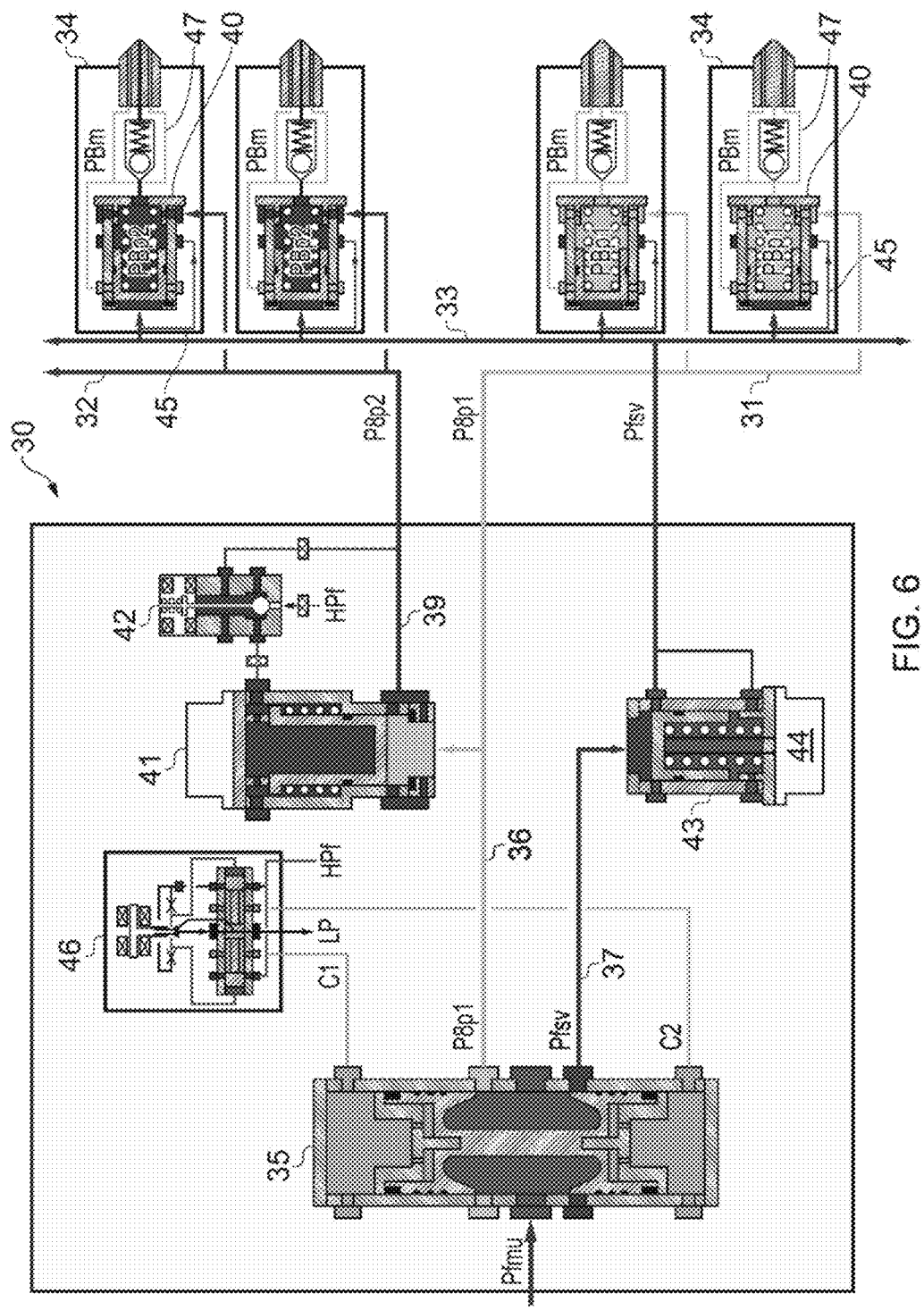
FIG. 6 shows schematically another variant of the staging system of FIG. 2 in pilot-only operating mode.

FIG. 6 shows schematically another variant of the staging system 30, in pilot-only operating mode. This variant is similar to that shown in FIG. 4. However, each injector 34 now also includes an optional pilot FSV 47 located between its mains FSV 40 and its pilot discharge orifice.

Figure 7:
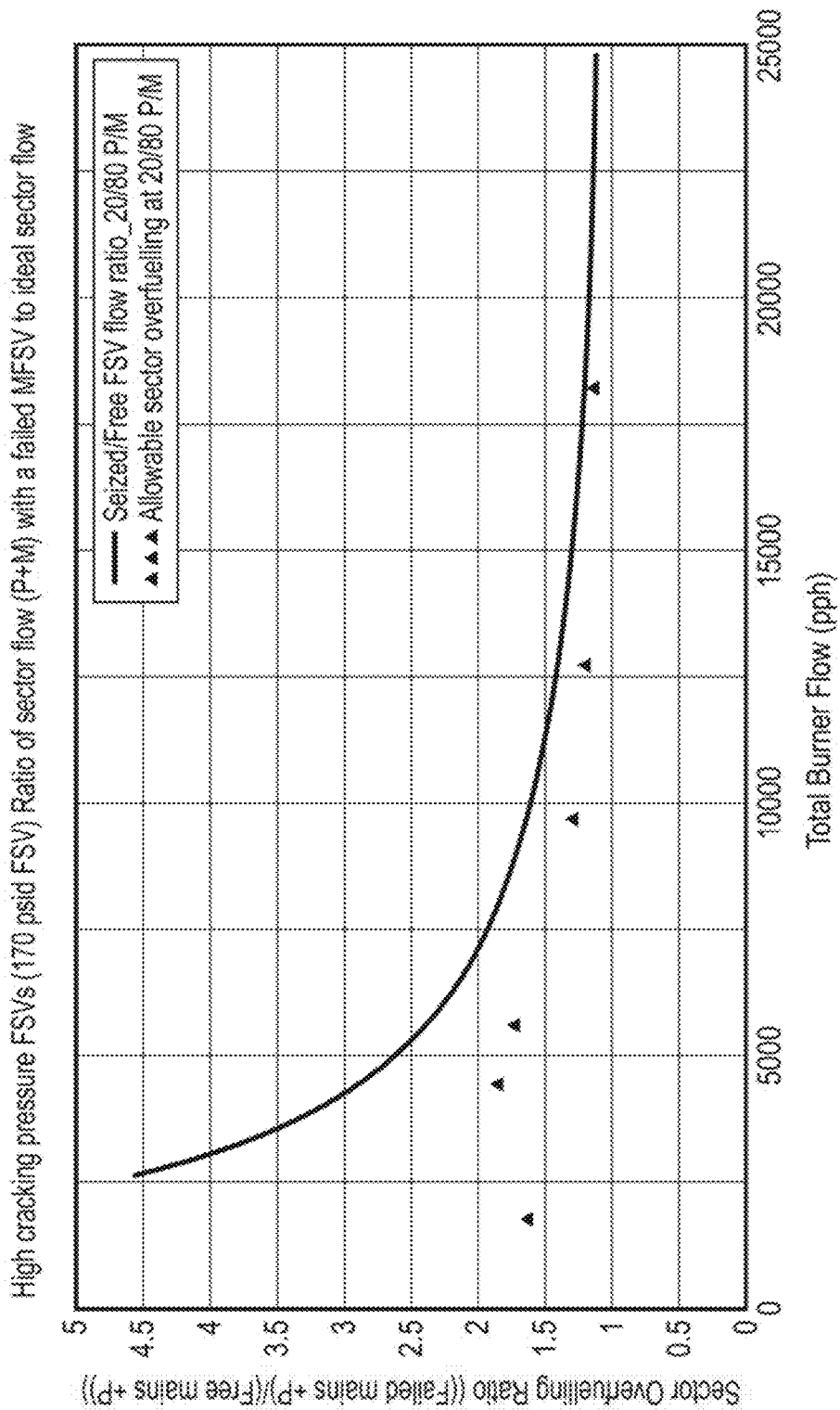
FIG. 7 shows a plot of sector over-fuelling ratio (one mains flow scheduling valve failed fully open) against total burner flow under a conventional staging system.
Figure 8:
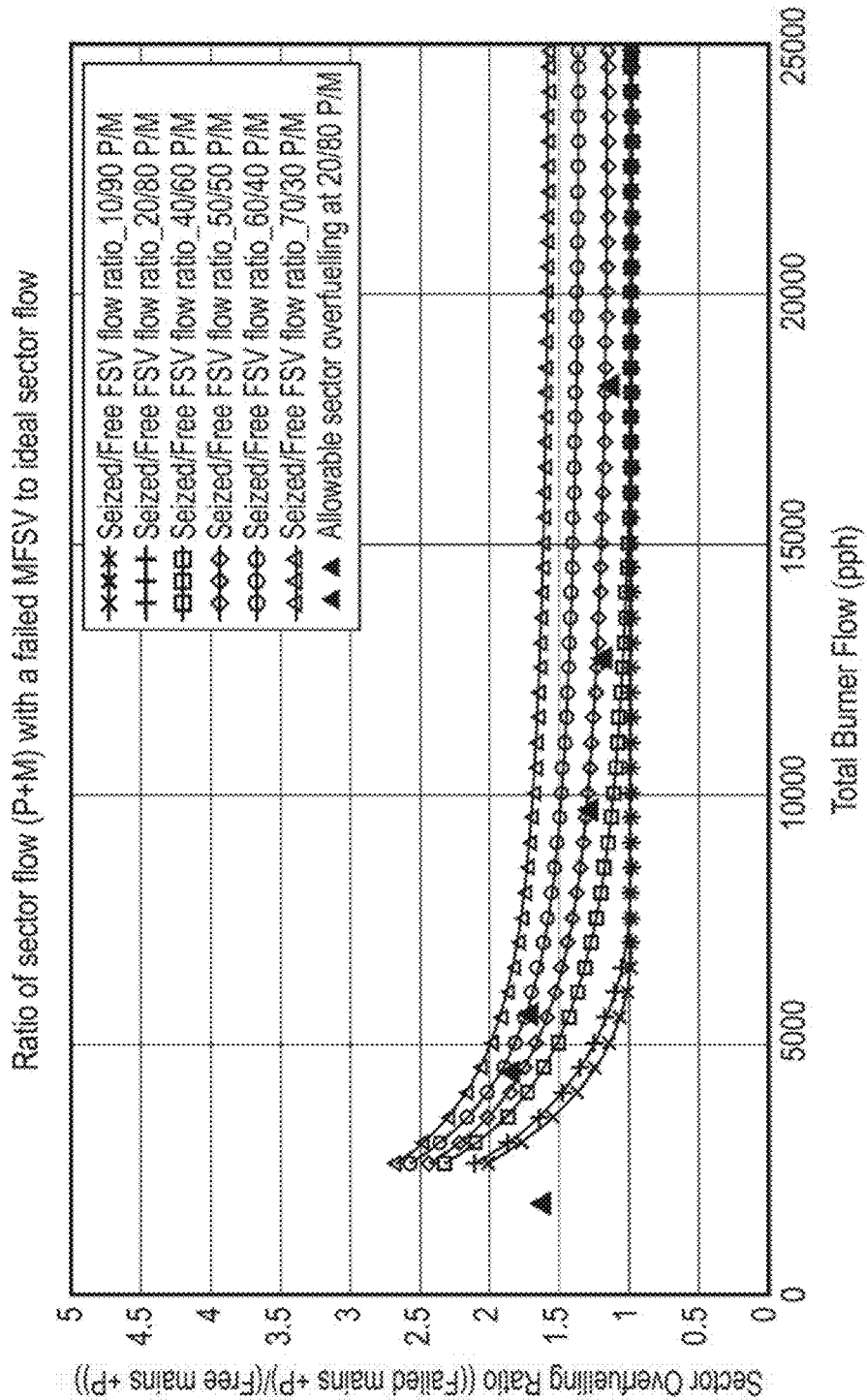
FIG. 8 shows a plot of sector over-fuelling ratio (one mains flow scheduling valve failed fully open) against total burner flow under a staging system of the present invention.

The plot of FIG. 7 relates to a conventional staging system such as that described in EP A 2469057 where high cracking pressure main FSVs are required to ensure that they do not open during pilot-only operation when the cooing manifold is operational. More particularly, in such a system the flow in the cooling manifold returns to an LP (gear pump inlet pressure) sink and, because LP can be high relative to combustion chamber pressure P30, a high FSV spring load is required to ensure the mains FSVs stay closed. The plot considers the level of overfuelling that can occur during pilot-only operation through a single mains injector when its associated mains FSV has failed fully open. The plot shows sector over-fuelling ratio against total burner flow. The high cracking pressure of about 170 psid (1.2 MPa) for the mains FSVs results in unacceptable over-fuelling across the entire operating range. Because the FSVs have a high cracking pressure, the flow through the failed open FSV can reach a high level before the other FSVs open. Thus, a high degree of mains flow mal-distribution is possible and this can result in turbine torching and subsequent damage. In contrast, FIG. 8 shows a plot of sector over-fuelling ratio (one mains flow scheduling valve failed fully open) against total burner flow under a staging system of the present invention. In this case, except for very low flows (i.e. a single over-fuelling point), the maximum over-fuelling is acceptable. This is because the flow through the failed open mains FSV does not reach a high level before sufficient pressure is generated to crack open the other FSVs. Thus, the degree of mains flow mal-distribution does not reach a high level for most operating conditions. This is a benefit of using low cracking pressure main FSVs, facilitated by referencing the spring side of the main FSVs to pilot manifold pressure. At low flow conditions, and particularly at high pilot/mains splits (i.e. above 40% pilot) there is still a risk of unacceptable overfuelling, albeit a lower risk than on a conventional staging system; the low mains flow means that normally operating FSVs operate at a low travel, accentuating the difference between flow through a failed open FSV (e.g. providing a 19.9 igph/sqrt(psi) (9.57 cc/s/sqrt(kPa) flow number)) and an active FSV.

Staging System—Embodiment 2

Figure 9:
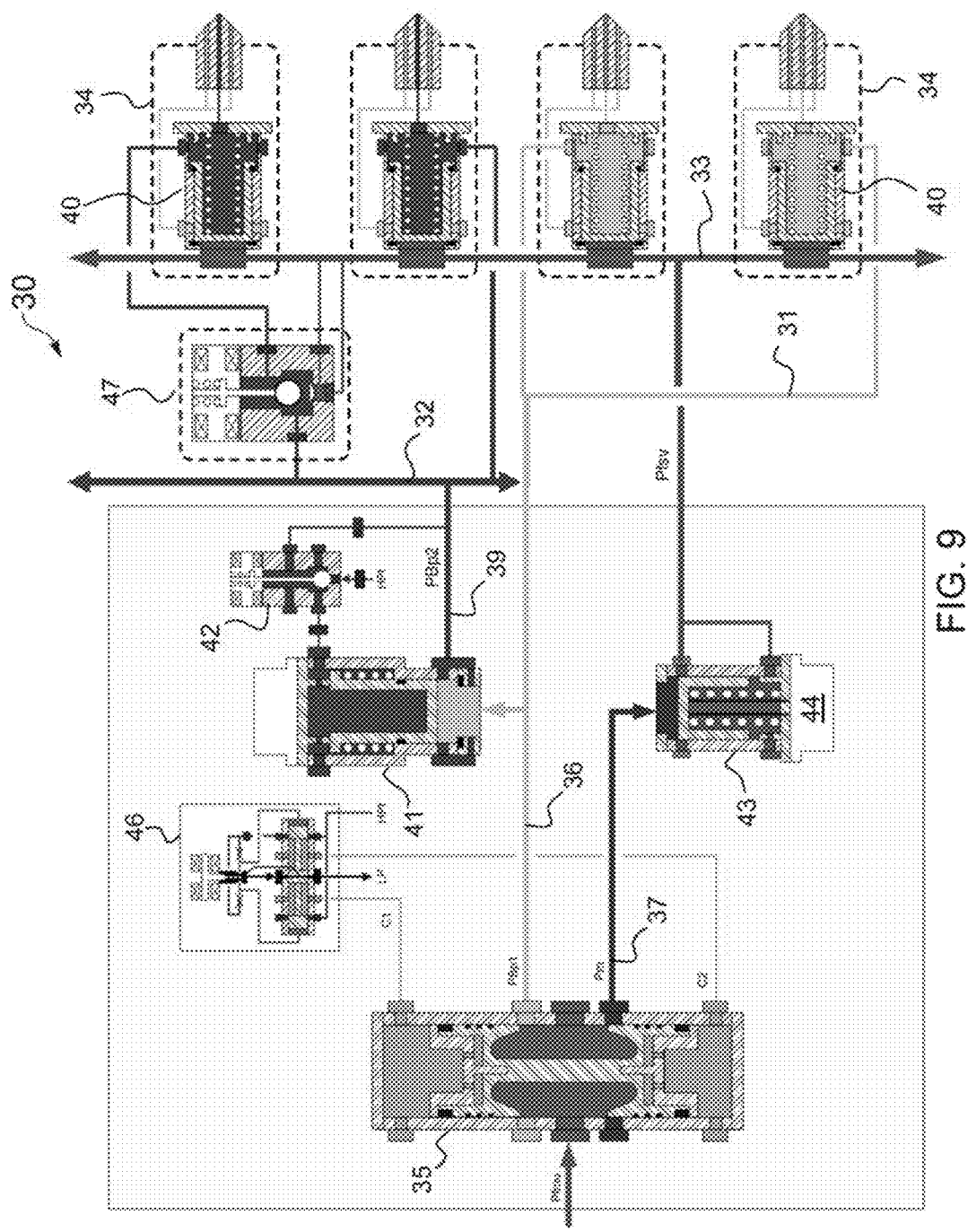
FIG. 9 shows schematically another staging system for fuel injectors of the combustor of the engine of FIG. 1 in pilot-only operating mode.

A second embodiment of the staging system 30 is shown schematically in FIG. 9. The staging system splits the fuel under the control of the EEC (not shown) into two flows: one at a pressure $PB_{p1}$ for first 31 and second 32 pilot manifolds and the other at a pressure $P_{fsv}$ for a mains manifold 33. The first pilot manifold feeds pilot discharge orifices of a subset of the fuel injectors. The second pilot manifold feeds pilot discharge orifices of the rest of the fuel injectors. The mains manifold feeds mains discharge orifices of all the fuel injectors. Mains fuel flow scheduling valves (FSVs) 40 at the injectors prevent combustion chamber gases entering the respective manifolds and also provide a drip tight seal between the mains manifold and the injectors when mains is de-staged. By varying the fuel split between the manifolds, the EEC can thus perform staging control of the engine.

In more detail, the staging system 30 has a fuel flow splitting valve (FFSV) 35, which receives the metered fuel flow from the HMU at pressure $P_{fmu}$. A spool is slidable within the FFSV under the control of a servo valve 46, the position of the spool determining the outgoing flow split between a pilot connection pipe 36 which delivers fuel to the first 31 and second 32 pilot manifolds and a mains connection pipe 37 which delivers fuel to the mains manifold 33. The spool can be positioned so that the mains stage is deselected, with the entire metered flow going to the pilot stage (except that a cooling flow is sent to the mains manifold during pilot-only operation, as discussed in more detail below). An LVDT (not shown) can provide feedback on the position of the spool to the EEC, which in turn controls staging by control of the servo valve 46.

The pilot discharge orifices are divided into two groups by the first 31 and second 32 pilot manifolds in order to provide lean blow out protection. More particularly, the second pilot manifold connects to the pilot connection pipe 36 via a further connection pipe 39 (at a $PB_{p2}$) and a lean blow out protection valve 41. This is operable to terminate or substantially reduce the supply of fuel to the second pilot manifold and associated pilot discharge orifices, when desired, so as to increase the flow of fuel to the first pilot manifold and associated discharge orifices under low fuel conditions for a given metered flow from the HMU. In the arrangement illustrated, the valve 41 is controlled by way of a solenoid operated control valve 42, although other forms of control are possible, such as by a servo-type valve (for example an electro hydraulic servo valve). In this way, under low fuel conditions the flow of fuel to the pilot discharge orifices may be directed preferentially via the first pilot manifold, whereby the risk of a lean blow out condition arising can be reduced. Further details of such lean blow out protection are described in EP A 2469057.

The part of the staging system 30 comprising the FFSV 35, servo valve 46, lean blow out protection valve 41 and control valve 42 is mounted to the fan case 24. The connection pipes 36, 37, 39 then extend across the bypass duct 22 to the manifolds 31, 32, 33, which wrap around the core engine in proximity to the injectors 34.

In the staging system described in EP A 2469057, each injector has a pilot FSV and a mains FSV for respectively the flows from pilot and mains manifolds. In contrast, in the staging system shown in FIG. 9, pilot FSVs are not necessary (although optional pilot FSVs can be located between the mains FSVs 40 and the pilot discharge orifices), and instead pilot flow is routed through modified mains FSVs 40 with negligible restriction: the mains FSVs 40 distribute the mains flow from the mains manifold 33 to the mains discharge orifices in the injectors 34, while the pilot flow is passed through the mains FSVs for valve cooling purposes. These FSVs each have a chamber containing a movable, spring-biased piston, with the chamber to a pilot (spring) side of the piston being in fluid communication with the respective pilot fuel manifold 31, 32 and the chamber to a mains (non-spring) side of the piston being in fluid communication with the mains fuel manifold 33. In this way, the FSVs 40 have a reduced cracking pressure with the pilot (spring) side of the FSVs being referenced to pilot manifold pressure ($PB_{p1}$ or $PB_{p2}$) rather than the lower pressure downstream of the FSVs (as is the case with the system of EP A 2469057). With the low cracking pressure, the pressures on either side of each piston ($P_{fsv}$ and $PB_p$) are approximately equal during the pilot-only operating mode such that the FSV springs maintain the FSVs 40 in a closed position (i.e. no flow from the mains manifold 33 through the FSVs to the mains discharge orifices of the injectors 34).

In this pilot-only operating mode, the position of the FFSV 35, controlled by the servo valve 46, is such that there is a large flow number opening between the HMU supply and the pilot connection pipe 36, such that $P_{fmu} \approx PB_{p1} \approx P_{fsv}$. Any difference between the metered fuel pressure ($P_{fmu}$) from the HMU supply and the pilot manifold pressures ($PB_{p1}$ and $PB_{p2}$) is generally less than 10 psid (69 kPa). This is insufficient to open the FSVs 40, which may have a cracking pressure of typically 30 psid (207 kPa). In the pilot-only mode there is a small opening in the FFSV between the HMU supply and the mains connection pipe 37 to allow for the cooling flow in the mains manifold 33. The mains manifold remains fully primed in pilot-only mode, such that there is no hazardous failure to meet acceleration requirements when mains staging is selected. When mains staging is selected the FFSV 35 (controlled by the servo-valve 46) moves to increase the opening between the HMU supply and the mains connection pipe 37. This reduces $PB_{p1}$ and $PB_{p2}$ relative to $P_{fsv}$, resulting in fuel flow to the mains discharge orifices of the injectors 34.

If one of the FSVs 40 falls such that it opens in pilot-and-mains mode, fuel flows from the HMU supply through the FFSV 35 to the mains manifold 33 and thence through the open port in the failed FSV to the mains discharge orifice of the respective injector 34. However, as the FSVs have a relatively low cracking pressure, only a marginal increase in pressure in the mains manifold, resulting from flow through the port in the failed FSV, causes the other FSVs to open. This then leads to a relatively even distribution of fuel flow injection around the combustor. Thus, by ensuring that the other FSVs open before a severe level of fuel flow through the failed FSV is reached (i.e. a level that results in hot streaks and turbine damage), the staging system 30 can mitigate the potentially hazardous mal-distribution issues associated with failed open mains FSVs in the system of EP A 2469057 which incorporates high cracking pressure FSVs.

The staging system 30 also allows complex cooling recirculation architectures to be avoided, which avoids the hazards that can result from combustion gases leaking past mains FSVs and thence to the low pressure side of the fuel system of the system.

Cooling of the FSVs 40 can be provided by the pilot flow that is continuously routed through the FSVs. Cooling arrangements can be provided for the pilot manifolds 31, 32 and the mains 33 manifold, e.g. by using a small portion of the air flow B through the bypass duct 22, and for the mains manifold in pilot-only operation using the cooling flow discussed below.

The pilot/mains flow split is achieved via movement of the spool within the FFSV 35. However, an accurate split (which may be otherwise by affected by FSV tolerances, variation and friction) can be promoted by either measuring the FFSV pressure differentials or by setting a constant pressure differential $P_{fmu}-PB_{p1}$ across the FFSV 35 inflow and outflow metering ports. This can be achieved in a number of ways. For example, the system 30 can have pressure sensors to measure $P_{fmu}-PB_{p1}$ and/or $P_{fmu}-P_m$ (where $P_m$ is the pressure in mains connection pipe 37). Combined with the spool position feedback provided by an LVDT, knowledge of the pressure drop(s) across the pilot/mains metering ports in the FFSV can allow the EEC to compute the pilot and mains flows, driving the FFSV via the servo valve 46 to set the required pilot/mains flow split. As another example, a pressure drop throttle valve located on the pilot connection pipe 36 can sense the pressure drop $P_{fmu}-PB_{p1}$ and throttle the pilot flow to maintain a constant $P_{fmu}-PB_{p1}$ pressure differential. With this pressure differential nominally constant, the plot flow can be set as a function of spool position with position measurement provided by an LVDT.

As yet another example, a flow sensing valve can be located on the pilot connection pipe 36 or the mains connection pipe 37. Such an example is illustrated in FIG. 9, the system having a mains fuel flow sensing valve (MFFSV) 43 on the mains connection pipe 37. The FFSV 35 then provides a coarse split and the MFFSV trims to the required accuracy. The position of the FFSV 35 is controlled via the servo valve 46 using the position feedback signal from the LVDT 44 attached to the MFFSV 43 to give accurate flow control in the connection pipes 36 and 37. In particular, the position feedback signal that is input to the staging control logic in the EEC is taken from an LVDT 44 measuring a spool position of the MFFSV rather than a spool position of the FFSV. In such an arrangement, MFFSV spool position is a measure of the mains flow.

To provide the cooling flow in the mains manifold 33 during pilot-only operation, the system 30 has a single-stage solenoid-operated mains cooling valve 47 which in pilot-only operation opens a bypass connection between the mains 33 and second pilot 32 fuel manifolds, allowing the cooling flow to pass from the mains fuel manifold to the pilot fuel manifold, and thence onwards for burning at the pilot orifices of the injectors 34. The mains cooling valve 47 closes during pilot-and-mains operation. The cooling flow in the bypass connection has a relatively large orifice size compared to possible alternative cooling arrangements such as distributed cooling orifices in the mains FSVs 40, and thus is relatively insensitive to contamination and ice build-up. The mains cooling valve 47 may be located in a relatively hot engine zone close to the injectors 34 to simplify pipework. The circumferential position of the valve on the engine can affect the amount of engine heat soak-back into the valve, and thus the resultant valve temperature. Accordingly, a location at the base of the engine is generally preferred.

More particularly, in the plot-only operating mode the cooling flow of fuel passes continuously from the mains manifold 33 to the second pilot fuel manifold 32, which maintains cooling in the mains manifold. This cooling flow is sensed by the MFFSV 43 and the feedback signal from the MFFSV LVDT 44 to the EEC is used to adjust the spool position of the FFSV 35 (via the servo valve 46) if the cooling flow needs to be altered. In the pilot-only operating mode, even with the cooling flow the pressure drop across each FSV piston ($P_{fsv}-PB_p$) is typically low, e.g. <5 psid (34 kPa). This is insufficient to open the FSVs which typically require 30 psid (207 kPa) for cracking and 27 psid (186 kPa) to lift the piston off its stop.

When the pilot-and-mains operating mode is selected, the spool position of the FFSV 35 is altered to increase the opening of the mains port of the FFSV and reduce the opening of the pilot port of the FFSV, which increases the pressure differential $P_{fmu}-PB_{p1}$ across the pilot port, thus producing a rise in pressure $P_{fsv}$ relative to $PB_{p1}$ and $PB_{p2}$. This results in the pistons of the FSVs 40 opening against their respective spring forces, and fuel flowing through the FSV to the mains discharge orifices of the injectors 34. The MFFSV now senses the flow to the mains discharge orifices of the injectors and the feedback signal from the LVDT 44 is used to adjust the FFSV spool position via the EEC and FFSV servo valve 46 to set the correct pilot/mains flow split.

Thus inclusion of the MFFSV 43 on the mains connection pipe 37 enables accurate control of the pilot/mains split irrespective of FSV tolerances, variation and friction. The MFFSV position from the LVDT 44 is a measure of mains manifold cooling flow during pilot-only operation, and total mains burnt flow during pilot-and-mains operation. This flow measurement signal is sent to and used by the EEC control logic to provide an MFFSV position demand signal that is used to drive the FFSV servo valve 46 to move the FFSV 35 to set the correct pilot/mains flow split (during pilot-and-mains operation) or the correct mains cooling flow (during pilot-only operation).

The MFFSV 43 also provides the ability to independently close off the cooling flow to the mains manifold 33. This can assist with a health monitoring determination of whether the mains FSVs 40 are failed open. More particularly, since the MFFSV provides a means of indicating the flow in the mains connection pipe 37, the MFFSV can identify deviations of cooling flow in pilot-only mode flow from expected values. For example, if the mains cooling valve 47 is shut initially when mains is de-staged, a flow registered by the MFFSV would indicate either that the valve 47 has not closed (when it should be closed) or that one or more of the mains FSVs 40 is open, when they should be closed.

Figure 10:
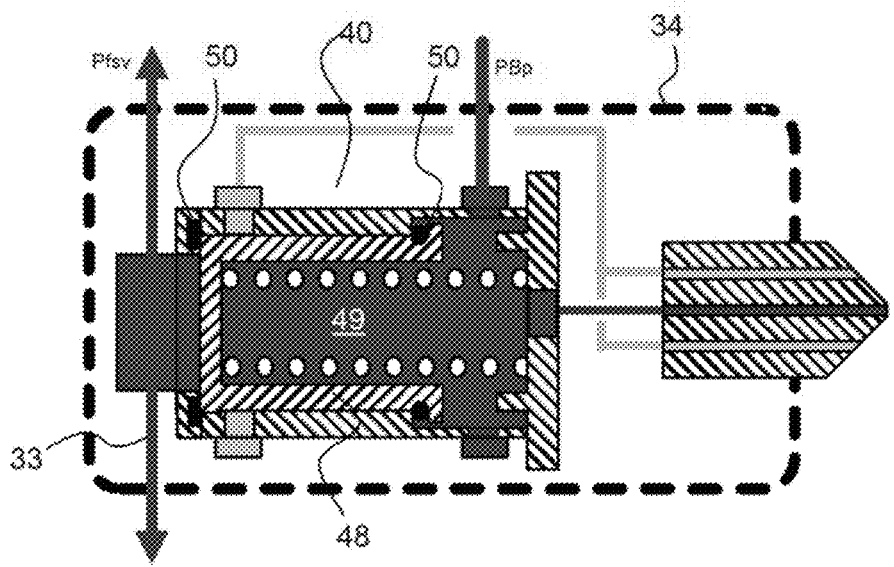
FIG. 10 shows schematically an injector of the system of FIG. 9 in pilot-only operating mode.
Figure 11:
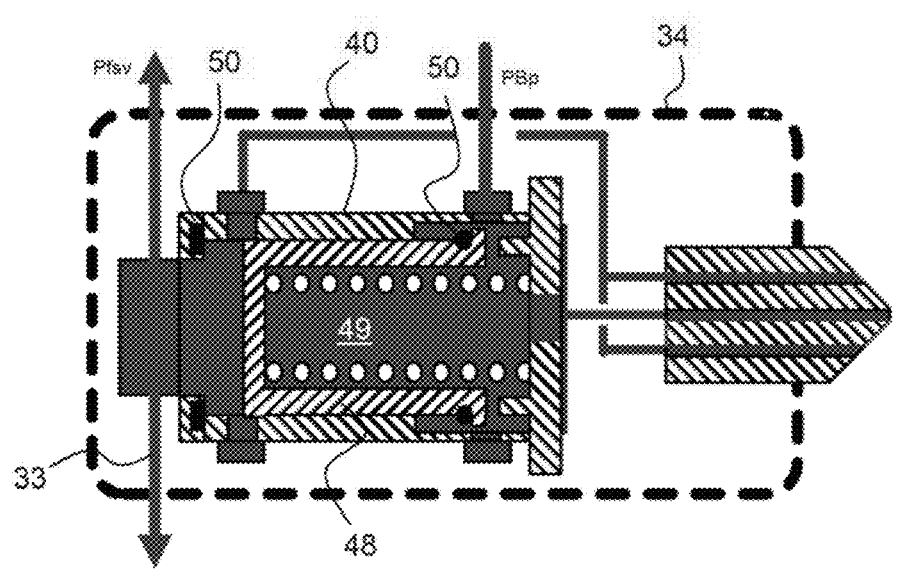
FIG. 11 shows schematically an injector of the system of FIG. 9 in pilot-and-mains operating mode.

FIGS. 10 and 11 show schematically an injector 34 of the system 30 of FIG. 9 in respectively pilot-only and pilot-and-mains operating modes. In the pilot-only position (FIG. 10), the piston 48 of the mains FSV 40 of the injector is dual face-sealed in the chamber 49 by seals 50 at both ends of the piston, such that there is substantially no leakage across the piston from $P_{fsv}$ or $PB_p$ to the engine combustion chamber. In the pilot-and-mains position (FIG. 11), however, the sealing is broken such that some fuel may leak from $PB_p$ to the mains flow line via clearance between the FSV piston 48 and the wall of the chamber 49. However, by avoiding dynamic sealing between the piston 40 and the chamber wall there is a lower level of friction between these components and little or no variation in the level of friction as the piston moves, which in turn reduces variation in operation of the mains FSVs 40. The benefit of consistency of valve movement as a result of lower, more consistent levels of friction between the piston and chamber wall outweighs any detrimental impact of the leakage on splitting accuracy.

Figure 12:
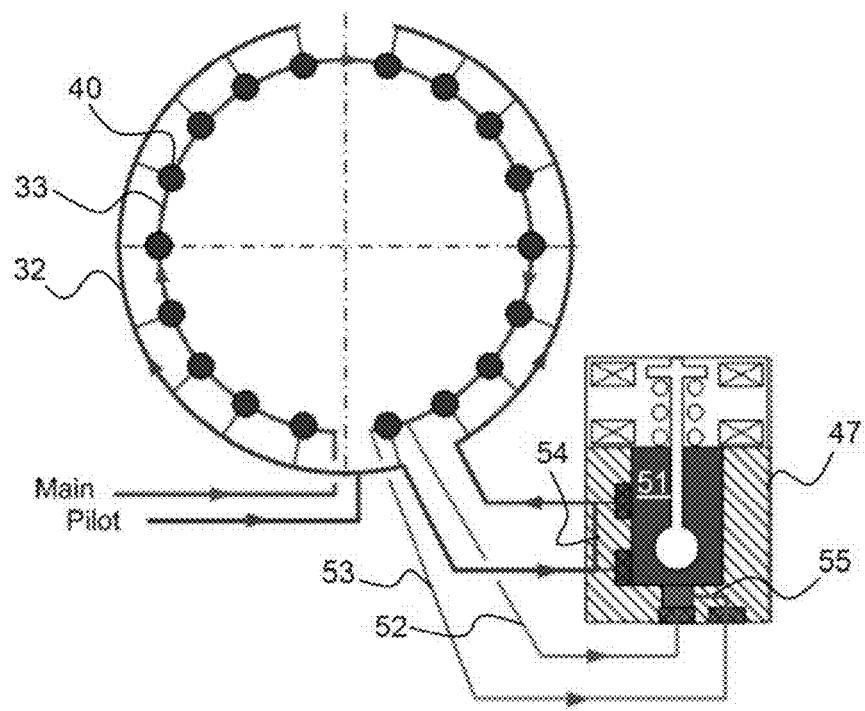
FIG. 12 shows schematically a configuration for routing cooling flow through mains and pilot manifolds in pilot-only operating mode.
Figure 13:
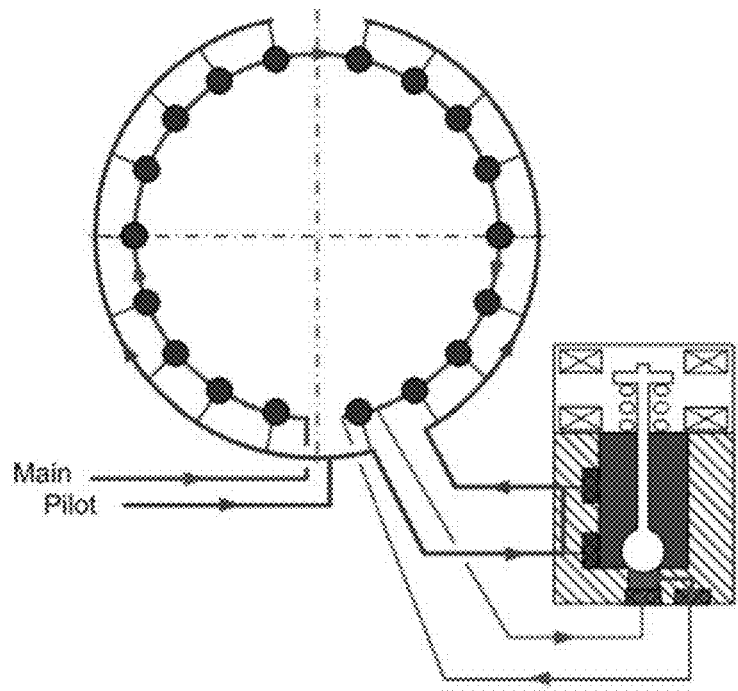
FIG. 13 shows schematically the configuration of FIG. 12 in pilot-and-mains operating mode.

Various configurations for routing the cooling flow through the mains 33 and second pilot 32 manifolds are possible. One such configuration is shown schematically in FIGS. 12 and 13 in respectively pilot-only and pilot-and-mains operating modes, arrows indicating directions of fuel flow. For simplicity, the first pilot manifold 31 is ignored, such that all the FSVs 40 are shown being fed by the second pilot manifold 32. The mains cooling valve 47 comprises a 2-way solenoid valve that falls to pilot mode. The mains manifold 33 is an end fed daisy chain such that flow through the mains manifold passes in series across respective entrances to the mains FSVs 40. Preferably any feeds from the mains manifold 33 to the mains FSVs are as short as possible to reduce the amount of stagnant fuel in these feeds in pilot-only operation. Indeed, as shown in FIGS. 9 to 11, the mains manifold may port directly to the mains sides of the chambers 49 of the FSVs, thus eliminating such feeds entirely. The pilot manifold 32 can have a split configuration (e.g. bottom fed to flow left and right), for example with pigtails joining the pilot manifold 32 to the FSVs 40. A section 54 of the pilot manifold 32 to one side of the split is within the mains cooling valve 47 such that half of the pilot fuel flow passes through the mains cooling valve for solenoid cooling purposes. By only routing a portion the pilot manifold fuel flow through the mains cooling valve 47, the size of the valve can be reduced. A flow path parallel to that of the section 54 is provided to allow a small portion of the pilot fuel flow into and out of the main valve cavity 51 thereby replenishing fuel in the cavity.

In pilot-only operating mode (FIG. 12), mains cooling flow enters the ring of the mains manifold 33 from the FFSV 35 and the MFFSV 43, and passes across the mains FSVs 40 in turn before passing to the pilot manifold 32 via a bypass connection comprising parallel first 52 and second 53 fuel lines, and the open mains cooling valve 47. The first fuel line 52 extends from the mains fuel manifold from an upstream side of the last entrance, while the second fuel line 53 extends from the mains fuel manifold from a downstream side of the last entrance. The last FSV in the daisy chain thus receives only a portion of the cooling flow. However, the parallel fuel lines 52, 53 ensure that there is always fuel flowing through the lines to keep the lines and the mains cooling valve 47 cool. More particularly, in the pilot-and-mains operating mode (FIG. 13), the mains fuel flow enter the mains manifold ring from the FFSV 35 and the MFFSV 43 to feed all the FSVs 40 in series. However, the last FSV 40 in the daisy chain receives its flow from the mains manifold (clockwise) and also via circulation (anticlockwise) through the parallel fuel lines 52, 53 and a connection 55 between the lines in the (otherwise closed) mains cooling valve 47. The amount of circulating flow can be set by balancing the line losses.

Figure 14:
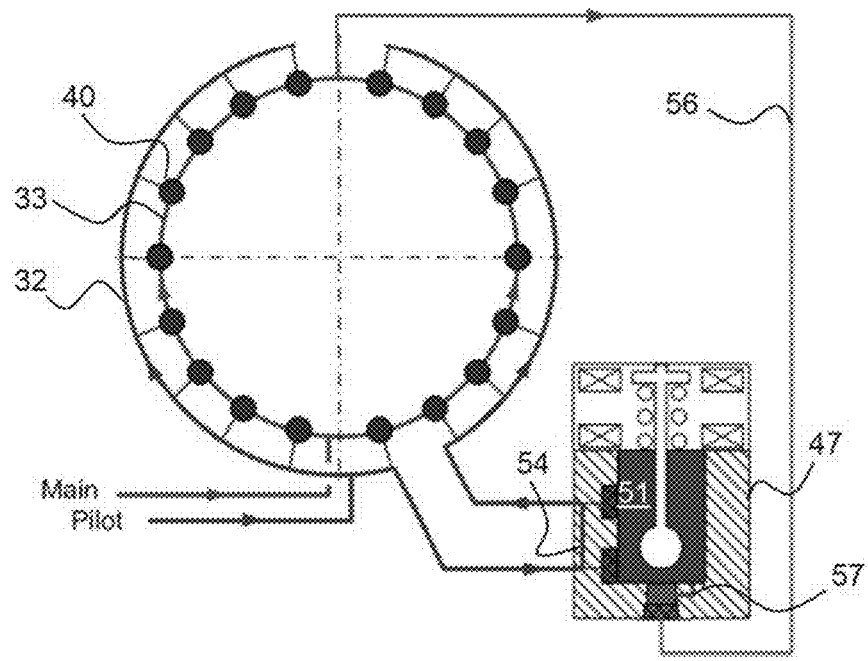
FIG. 14 shows schematically a variant configuration for routing cooling flow through mains and pilot manifolds in pilot-only operating mode.
Figure 15:
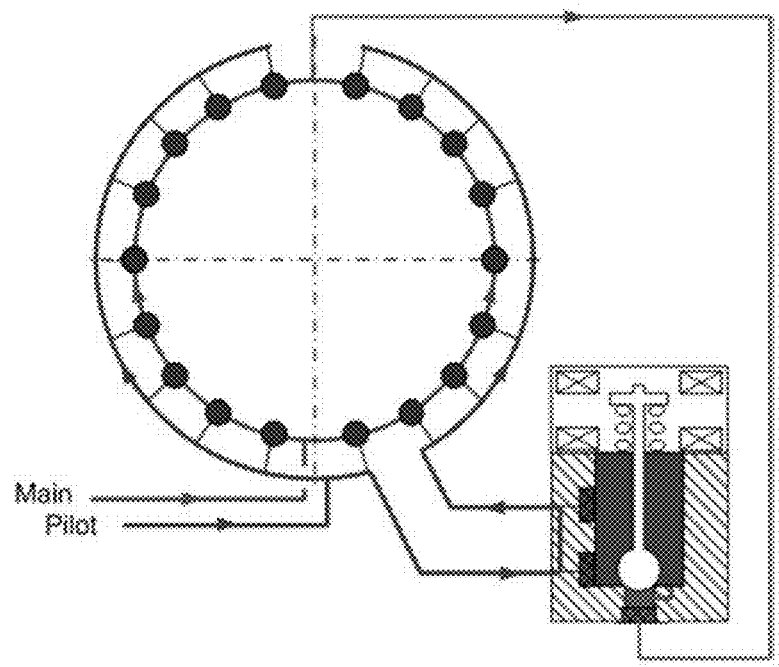
FIG. 15 shows schematically the variant configuration of FIG. 14 in pilot-and-mains operating mode.

A variant routing configuration is shown schematically in FIGS. 14 and 15 in respectively pilot-only and pilot-and-mains operating modes, arrows again indicating directions of fuel flow. The mains manifold 33 is now a complete daisy chain fed from the bottom, with flow passing left and right, to allow cooling flow to pass across all the mains FSVs 40. The bypass connection between the mains 33 and pilot 32 fuel manifolds comprises a fuel line 56 extending from the top of the mains manifold to prevent a stagnant region at top-dead-centre. There is always flow in this region in all operating modes. As with the previous configuration, the pilot manifold 32 can have a split configuration with pigtails joining the pilot manifold 32 to the FSVs 40. Similarly, a section 54 of the pilot manifold 32 to one side of the split is within the mains cooling valve 47.

In a pilot-only operating mode (FIG. 14), the cooling flow enters the mains manifold ring from the FFSV 35 and the MFFSV 43 and is split between the left and right potions of the ring to feed the FSVs 40 in respective left and right series. The fuel line 56 sends the cooling flow to the open mains cooling valve 47, and there it proceeds to the pilot manifold 32. In the pilot-and-mains operating mode (FIG. 15) the mains cooling valve 47 is closed, but a small leakage flow from mains to pilot can be set up in the mains cooling valve 47 by a bypass line 57 to cool and maintain flow in the fuel line 56. However, as a consequence control of the fuel splitting is less optimal than in the previous configuration because the leakage flow diverts some mains fuel flow to pilot.

SUMMARY

The staging system of the present invention has mains FSVs 40 and optional pilot FSVs 47, which are typically located at the head of each injector. The mains FSVs close when mains is deselected and at shut down, and the optional pilot FSVs close at shut down, in order to:

Retain a fully primed mains manifold 33 when the mains are staged out to facilitate rapid relight for "go around" cases.

Provide a drip tight seal to avoid fuel degradation/lacquering/coking in the injector passageways when the mains is staged out.

Provide a drip tight seal for both the pilot and mains discharge orifices at shut down to avoid injector coking/lacquering during soak back and to avoid fuel leaking into the combustor.

They also help to achieve a uniform injector to injector flow distribution at low flow conditions. In particular, a narrow metering profile ensures that if one mains FSV 40 opens first, a small change in flow through it causes a large change in pressure sufficient to crack the other mains FSVs 40 so that the flow is evenly distributed.

The system also addresses potentially hazardous failure modes and complexity associated with systems having complex recirculation architectures. To summarise:

Pilot FSVs can be deleted to avoid a risk of pilot flow mal-distribution resulting in hot streaks and turbine damage.

Referencing the mains FSV chamber to the pilot (spring) side of its piston to pilot manifold pressure, allows the cracking pressure of the mains FSVs to be reduced. This in turn means that if one mains FSV fails fully open, the resultant injector to injector flow mal-distribution is decreased so the threat of hot streaks and turbine damage is also reduced.

By avoiding a complex recirculation architecture, the mains manifold pressure $P_{fsv}$ can be maintained above the combustion chamber pressure so that combustion gases cannot ingress into the fuel system. This also helps to ensure that the mains manifold remains fully primed at all conditions so that there is no hazardous risk of failing to meet engine acceleration requirements at a "go around" condition.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A combustion staging system for fuel injectors of a multi-stage combustor of a gas turbine engine, the system having:
a splitting unit which receives a metered fuel flow and controllably splits the metered fuel flow into out-going pilot and mains fuel flows to perform pilot-only and pilot-and-mains staging control of the combustor;
pilot and mains fuel manifolds which respectively receive the pilot and mains fuel flows; and
a plurality of parallel mains flow scheduling valves which distribute the mains fuel flow from the mains manifold to mains discharge orifices of respective injectors of the combustor and which also pass the pilot fuel flow from the pilot manifold to pilot discharge orifices of the respective injectors;
wherein each mains flow scheduling valve has a chamber containing a movable piston, the chamber to a pilot side of the piston being in fluid communication with the pilot fuel manifold and the chamber to a mains side of the piston being in fluid communication with the mains fuel manifold, the piston being biased towards a closed pilot-only position which prevents flow out of the mains side of the chamber to the mains discharge orifice of the respective injector, and the piston being movable under an increase in pressure in the mains fuel manifold to an open pilot-and-mains position which allows flow out of the mains side of the chamber to the mains discharge orifice of the respective injector, and
wherein the mains flow scheduling valves are configured such that the pilot fuel flow from the pilot manifold to the pilot discharge orifices of the respective injectors passes through the respective chambers on the pilot sides of the pistons, and wherein the pilot side of the piston and the main side of the piston are on opposing sides of the piston.

2. The combustion staging system according to claim 1, wherein each mains flow scheduling valve further has a cooling flow bypass line providing fluid communication between the mains and pilot sides of its chamber, and the splitting unit is configured to allow a cooling flow through the mains fuel manifold when the mains flow scheduling valves are in their pilot-only positions, wherein the cooling flow passes through the bypass lines to cool the mains fuel manifold during pilot-only operation.

3. The combustion staging system according to claim 2, wherein the piston shuts off the bypass line when the piston is in its pilot-and-mains position.

4. The combustion staging system according to claim 1, wherein the splitting unit sends a cooling flow to the mains fuel manifold during pilot-only operation; and wherein the system further has a mains cooling valve which, during pilot-only operation, opens a bypass connection between the mains and pilot fuel manifolds such that the cooling flow passes from the mains fuel manifold to the pilot fuel manifold.

5. The combustion staging system according to claim 4, wherein the mains cooling valve closes the bypass connection during pilot-and-mains operation.

6. The combustion staging system according to claim 4, wherein the mains cooling valve reduces the flow area of the bypass connection during pilot-and-mains operation, allowing a leakage flow to pass from the mains fuel manifold to the pilot fuel manifold.

7. The combustion staging system according to claim 4, wherein each mains flow scheduling valve provides a leak-tight seal between the pilot and mains sides of the chamber when its piston is in its pilot-only position, and a reduced seal between the pilot and mains sides of the chamber when the piston is in its pilot-and-mains position.

8. The combustion staging system according to claim 4, wherein the mains manifold is configured such that flow through the mains manifold passes in series across respective entrances to the mains flow scheduling valves, the bypass connection between the mains and pilot fuel manifolds comprising parallel first and second fuel lines, the first fuel line extending from the mains to the pilot fuel manifold from an upstream side of the last entrance, the second fuel line extending from the mains to the pilot fuel manifold from a downstream side of the last entrance, and the first and second lines being in fluid communication in the mains cooling valve such that during pilot-and-mains operation fuel circulates around the first and second fuel lines.

9. The combustion staging system according to claim 4, wherein the mains manifold is configured such that flow through the mains manifold splits into a first fraction which passes in series across respective entrances to a first portion of the mains flow scheduling valves, and a second fraction which passes in second series across respective entrances to a remaining second portion of the mains flow scheduling valves, the bypass connection between the mains and pilot fuel manifolds comprising a fuel line extending from the mains manifold from a location on the mains manifold which is downstream of the last entrances of the first and second portions of the mains flow scheduling valves.

10. The combustion staging system according to claim 1, wherein the system further has control means for setting a constant pressure differential between the metered fuel flow received by the splitting unit and the pilot fuel flow out of the splitting unit.

11. The combustion staging system according to claim 10, wherein the splitting unit has a flow splitting valve having a spool whose position is controllable to control the split of the metered fuel flow between the pilot and mains fuel flows, and wherein the control means comprises:
a pressure sensor to measure the pressure differential between the metered fuel flow received by the splitter valve and the pilot fuel flow out of the splitter valve, and/or a further pressure sensor to measure the pressure differential between the metered fuel flow received by the splitter valve and the mains fuel flow out of the splitter valve; and
a device to measure the position of the spool.

12. The combustion staging system according to claim 10, wherein the control means comprises a pressure drop throttle valve located between the splitting unit and the pilot manifold to controllably throttle the pilot fuel flow and/or between the splitting unit and the mains manifold to controllably throttle the mains fuel flow.

13. The combustion staging system according to claim 10, wherein the control means comprises:
a flow sensing valve located between the splitting unit and the pilot manifold to measure the flow rate of the pilot fuel flow through the flow sensing valve, or a flow sensing valve located between the splitting unit and the mains manifold to measure the flow rate of the mains fuel flow through the flow sensing valve.

14. The combustion staging system according to claim 1, further having a plurality of pilot flow scheduling valves, each receiving the pilot fuel flow passed by a respective one of the mains flow scheduling valve, the pilot flow scheduling valves distributing the received pilot fuel flow to their respective pilot discharge orifices when the pilot fuel flow exceeds a cracking pressure set by the pilot flow scheduling valves.

15. A gas turbine engine having the combustion staging system according to claim 1.

* * * * *